(12) United States Patent
Juni et al.

(10) Patent No.: US 7,957,615 B2
(45) Date of Patent: Jun. 7, 2011

(54) OPTICAL WAVEGUIDE FOR TOUCH PANEL, TOUCH PANEL USING THE OPTICAL WAVEGUIDE AND MANUFACTURING METHOD OF THE OPTICAL WAVEGUIDE

(75) Inventors: Noriyuki Juni, Ibaraki (JP); Yusuke Shimizu, Ibaraki (JP)

(73) Assignee: Nitto Denko Corporation, Ibaraki-Shi, Osaka (JP)

( * ) Notice: Subject to any disclaimer, the term of this patent is extended or adjusted under 35 U.S.C. 154(b) by 265 days.

(21) Appl. No.: 12/343,736

(22) Filed: Dec. 24, 2008

(65) Prior Publication Data

US 2009/0174683 A1 Jul. 9, 2009

Related U.S. Application Data

(60) Provisional application No. 61/021,686, filed on Jan. 17, 2008.

(30) Foreign Application Priority Data

Dec. 25, 2007 (JP) .................................. 2007-332571

(51) Int. Cl.
G02B 6/32 (2006.01)
G06F 3/041 (2006.01)
(52) U.S. Cl. ................ 385/33; 385/32; 385/35; 385/47; 385/131; 345/176
(58) Field of Classification Search .................... 385/32, 385/33, 35, 47, 50, 129–132; 345/173, 175, 345/176
See application file for complete search history.

(56) References Cited

U.S. PATENT DOCUMENTS

| | | | |
|---|---|---|---|
| 5,914,709 A | 6/1999 | Graham et al. | |
| 6,181,842 B1 | 1/2001 | Francis et al. | |
| 6,351,260 B1 | 2/2002 | Graham et al. | |
| 6,810,160 B2 | 10/2004 | Sugama et al. | |
| 7,068,871 B2 | 6/2006 | Sugama et al. | |
| 7,412,119 B2 * | 8/2008 | Smits | 385/14 |
| 7,471,865 B2 | 12/2008 | Graham | |

(Continued)

FOREIGN PATENT DOCUMENTS

EP 1237019 A2 9/2002

(Continued)

OTHER PUBLICATIONS

European Search Report dated Sep. 29, 2010, issued in corresponding European Patent Application No. 08022185.6.

(Continued)

Primary Examiner — Daniel Petkovsek
(74) Attorney, Agent, or Firm — Westerman, Hattori, Daniels & Adrian, LLP

(57) ABSTRACT

An optical waveguide for a touch panel which eliminates the need for alignment between the optical waveguide and a lens and which achieves the appropriate emission and reception of light beams, to provide a touch panel using the optical waveguide, and to provide a manufacturing method of the optical waveguide for a touch panel. A total distance (L) which is the sum of a distance from the center of curvature of the first lens portion 30 to the light reflecting surface 60 and a distance from the light reflecting surface 60 to the tip of the second lens portion 50, and the radius (R) of curvature of the second lens portion 50 satisfy the following condition (A):

$$(L/3)-0.5 < R < (L/3)+0.5 \qquad (A)$$

where L in mm, and R in mm.

4 Claims, 5 Drawing Sheets

U.S. PATENT DOCUMENTS

| | | |
|---|---|---|
| 7,520,050 B2 | 4/2009 | Graham |
| 7,627,209 B2 * | 12/2009 | Hikita ............................. 385/32 |
| 2004/0057689 A1 | 3/2004 | Shimizu et al. |
| 2004/0201579 A1 | 10/2004 | Graham |
| 2005/0271319 A1 | 12/2005 | Graham |
| 2005/0271326 A1 | 12/2005 | Luo |
| 2006/0001653 A1 | 1/2006 | Smits |
| 2006/0002655 A1 | 1/2006 | Smits |
| 2006/0114244 A1 | 6/2006 | Saxena et al. |
| 2007/0154133 A1 | 7/2007 | Graham |
| 2008/0074402 A1 * | 3/2008 | Cornish et al. ................ 345/176 |

FOREIGN PATENT DOCUMENTS

| | | | |
|---|---|---|---|
| JP | 3-67319 A | 3/1991 |
| JP | 9-212303 A | 8/1997 |
| JP | 2001-514779 T | 9/2001 |
| JP | 2006-155616 A | 6/2006 |
| JP | 2006522987 T | 10/2006 |
| JP | 2008502009 T | 1/2008 |
| JP | 2008-504563 T | 2/2008 |
| JP | 2008-505399 T | 2/2008 |
| JP | 2008-530641 T | 8/2008 |
| WO | 98-40844 A1 | 9/1998 |
| WO | 2004-093045 A1 | 10/2004 |
| WO | 2005/121851 A2 | 12/2005 |
| WO | 2005/121852 A1 | 12/2005 |
| WO | 2006/004775 A1 | 1/2006 |
| WO | 2006045142 A1 | 5/2006 |
| WO | 2006/081633 A1 | 8/2006 |

OTHER PUBLICATIONS

Partial European Search Report dated Apr. 28, 2010, issued in corresponding European Patent Application No. 08022185.

* cited by examiner

PRIOR ART

OPTICAL WAVEGUIDE FOR TOUCH PANEL, TOUCH PANEL USING THE OPTICAL WAVEGUIDE AND MANUFACTURING METHOD OF THE OPTICAL WAVEGUIDE

RELATED APPLICATIONS

This application claims the benefit of U.S. Provisional Application No. 61/021,686, filed Jan. 17, 2008, which is hereby incorporated by reference.

BACKGROUND OF THE INVENTION

1. Field of the Invention

The present invention relates to an optical waveguide for a touch panel, a touch panel using the optical waveguide, and a manufacturing method of the optical waveguide for a touch panel.

2. Description of the Related Art

Touch panels are input devices for operating an apparatus by directly touching a display screen of a liquid crystal display device or the like with a finger, a purpose-built stylus or the like, and include a display which displays operation details and the like, and a detection means which detects the position (coordinates) of a portion of the display screen of the display touched with the finger or the like. Information about the touch position detected by the detection means is sent in the form of a signal to the apparatus, which in turn performs an operation and the like displayed on the touch position. Examples of the apparatus employing such a touch panel include ATMs in banking facilities, ticket vending machines in stations, portable game machines, and the like.

A detection means employing an optical waveguide is proposed as the detection means for detecting the finger touch position and the like on the above-mentioned touch panel (see, for example, US 2006/0002655A1). Specifically, the touch panel includes a strip-shaped optical waveguide 70 wound on peripheral side surfaces of a rectangular display 11, and a rectangular frame-shaped lens 71 provided on an upper edge portion of a display screen of the above-mentioned display 11, as shown in FIG. 7. A multiplicity of cores which pass light beams therethrough are formed in the above-mentioned optical waveguide 70. With the optical waveguide 70 wound as described above, first end surfaces (light emitting surfaces and light receiving surfaces) of the respective cores are formed so as to be oriented toward the above-mentioned frame-shaped lens 71. A multiplicity of light beams emitted from a portion of the optical waveguide 70 provided on one side portion of the peripheral side surfaces of the display 11 are caused to change the direction of their paths so as to travel in parallel with the display screen of the display 11 by a first portion of the above-mentioned frame-shaped lens 71, and thereafter are caused to change the direction of their paths so as to enter a portion of the optical waveguide 70 provided on the other side portion by a second portion of the frame-shaped lens 71 opposed to the first portion thereof. In this manner, the above-mentioned optical waveguide 70 and the frame-shaped lens 71 cause the light beams to travel in a lattice form on the display screen of the display 11. When a portion of the display screen of the display 11 is touched with a finger in this state, the finger blocks some of the light beams. Therefore, the light-receiving portion of the optical waveguide 70 senses a light blocked portion, whereby the position of the portion touched with the finger is detected.

For a touch panel using the above-mentioned optical waveguide 70, it is necessary that the light beams emitted from the light-emitting portion of the optical waveguide 70 into the air be incident on the cores of the light-receiving portion of the optical waveguide 70. In this case, when the emitted light beams spread too wide, there is a low probability that the light beams enter the cores of the light-receiving portion, which results in low optical transmission efficiency. Narrowing down the emitted light beams too much, on the other hand, reduces the size of a light-receiving region to make it difficult for the cores of the light-receiving portion to receive the light beams (or to make it impossible for the cores of the light-receiving portion to receive the light beams if the cores of the light-receiving portion are deviated from their proper position even slightly).

In the touch panel using the above-mentioned optical waveguide 70, the light beams do not appropriately pass through the frame-shaped lens 71 so that the optical transmission efficiency is not sufficiently enhanced unless precise alignment is performed between the optical waveguide 70 and the frame-shaped lens 71. Additionally, the precise alignment requires accuracy and is hence difficult. It is labor- and time-consuming to achieve the precise alignment.

SUMMARY OF THE INVENTION

In view of the foregoing, it is an object of the present invention to provide an optical waveguide for a touch panel which eliminates the need for alignment between the optical waveguide and a lens and which achieves the appropriate emission and reception of light beams, to provide a touch panel using the optical waveguide, and to provide a manufacturing method of the optical waveguide for a touch panel.

To accomplish the above-mentioned object, a first aspect of the present invention is intended for an optical waveguide for a touch panel, which comprises: a body; a plurality of cores formed on a predetermined portion of a surface of the body, the plurality of cores including a light-emitting core for emitting light beams and a light-receiving core for receiving the light beams; and an over cladding layer formed on the surface of said body while covering the plurality of cores, the optical waveguide being provided along peripheral side surfaces of a display of the touch panel, the light-emitting core including an end portion positioned in a first side portion of the peripheral side surfaces of said display, the light-receiving core including an end portion positioned in a second side portion of the peripheral side surfaces of said display, the end portion of said light-emitting core and the end portion of the light-receiving core each being formed as a first lens portion having a curved lens surface which bulges outwardly, the over cladding layer including an edge portion covering said first lens portion, the edge portion of the over cladding layer extending while being bent toward said body to form a bend, the bend including a tip portion formed as a second lens portion having a curved lens surface which bulges outwardly, the bend including a rear end portion on the side opposite from the second lens portion, the rear end portion of the bend being formed as a light reflecting surface for changing the optical path of light beams so as to cause the same light beams to pass through the curved lens surface provided in the tip portion of said first lens portion and the curved lens surface provided in the tip portion of the second lens portion, wherein a total distance (L) which is the sum of a distance from the center of curvature of the curved lens surface of said first lens portion to said light reflecting surface and a distance from the light reflecting surface to the tip of the curved lens surface of said second lens portion, and the radius (R) of curvature of the curved lens surface of said second lens portion satisfy the following condition (A):

$$(L/3)-0.5 < R < (L/3)+0.5 \quad (A)$$

where L in mm, and R in mm.

A second aspect of the present invention is intended for a touch panel which comprises the above-mentioned optical waveguide for a touch panel, the optical waveguide being provided along the peripheral side surfaces of a display of the touch panel, the first lens portion of the light-emitting core which emits light beams being positioned in the first side portion of the peripheral side surfaces of said display, the first lens portion of the light-receiving core which receives the light beams being positioned in the second side portion of the peripheral side surfaces of said display, wherein the bend provided in the edge portion of the over cladding layer which covers said first lens portion is positioned on a peripheral edge portion of a display screen of the display.

A third aspect of the present invention is intended for a method of manufacturing the above-mentioned optical waveguide for a touch panel, which comprises the steps of: forming a core on a predetermined portion of a surface of a body, said core including an end portion formed as a first lens portion; setting the core formed on the predetermined portion of the surface of the body in a molding die to inject a material for the formation of an over cladding layer into the molding die; and hardening the injected material to form the over cladding layer on the surface of said body so as to cover said core, wherein an edge portion of the over cladding layer covering said first lens portion is formed as a bend having a second lens portion and a light reflecting surface.

The present inventors have invented forming the lens portion (the second lens portion) in the edge portion of the over cladding layer covering the end portion of each of the cores to solve the above-mentioned problem. Since the cores and the over cladding layer are originally integral with each other, this allows the optical waveguide for the touch panel according to the present invention to achieve alignment between the end portion of each of the cores and the lens portion provided in the edge portion of the over cladding layer when the over cladding layer is formed. Further, the present inventors have invented forming the end portion of each of the cores also as the lens portion (the first lens portion) to achieve the appropriate emission and reception of light beams, and have made studies of the mutual positional relationship between the first lens portion and the second lens portion and the like. As a result, the present inventors have made a finding that, when the light reflecting surface for changing the optical path of light beams so as to cause the same light beams to pass through the above-mentioned first lens portion and the second lens portion is formed in the rear end portion of the above-mentioned second lens portion and when the total distance (L) which is the sum of the distance from the center of curvature of the curved lens surface of the above-mentioned first lens portion to the above-mentioned light reflecting surface and the distance from the light reflecting surface to the tip of the curved lens surface of the above-mentioned second lens portion and the radius (R) of curvature of the curved lens surface of the above-mentioned second lens portion satisfy the above-mentioned condition (A), then the light beams emitted from the first lens portion provided in the end portion of each of the cores are restrained from diverging by refraction through the first lens portion, are reflected from the above-mentioned light reflecting surface in this state to change their optical path toward the curved lens surface of the second lens portion, and are further restrained from diverging by refraction through the second lens portion. Further, the present inventors have found that, in the second lens portion formed in the edge portion of the over cladding layer on the light-receiving side, incident light beams are narrowed down and converged by refraction through the second lens portion, are reflected from the above-mentioned light reflecting surface in this state to change their optical path toward the first lens portion, are further narrowed down and converged by refraction through the first lens portion, and travel toward the interior of each of the cores. Thus, the present inventors have attained the present invention.

In the optical waveguide for the touch panel according to the present invention, the edge portion of the over cladding layer covering the first lens portion provided in the end portion of the light-emitting core and the first lens portion provided in the end portion of the light-receiving core extends while being bent toward the body to form a bend. The bend includes the tip portion formed as the second lens portion, and the rear end portion formed on the side opposite from the second lens portion and serving as the light reflecting surface for changing the optical path of light beams so as to cause the same light beams to pass through the curved lens surface provided in the tip portion of the above-mentioned first lens portion and the curved lens surface provided in the tip portion of the second lens portion. This allows the optical waveguide for the touch panel according to the present invention to achieve the automatic alignment between the first lens portion provided in the end portion of each of the cores and the second lens portion provided in the edge portion of the over cladding layer when the over cladding layer is formed. Thus, the need for a process of aligning the first lens portion provided in the end portion of each of the cores and the second lens portion provided in the edge portion of the over cladding layer with each other is eliminated. Additionally, the first lens portion, the second lens portion and the light reflecting surface described above are formed in a specific positional relationship with each other and the radius of curvature of the curved lens surface of the second lens portion is formed to have specific dimensions so that the above-mentioned condition (A) is satisfied. Thus, the light beams emitted from the first lens portion provided in the end portion of each of the cores are appropriate in divergence because of the refraction through the first lens portion, the reflection from the light reflecting surface and the refraction through the second lens portion. The light beams incident on the first lens portion provided in the end portion of each of the cores are narrowed down and converged by the refraction through the second lens portion, the reflection from the light reflecting surface and the refraction through the first lens portion. As a result, the optical waveguide allows optical transmission between the light-emitting core and the light-receiving core with appropriate optical transmission efficiency.

The touch panel according to the present invention includes the above-mentioned optical waveguide for the touch panel. Thus, the light beams emitted from the first lens portion provided in the end portion of each core is reflected from the light reflecting surface, and the reflected light beams which are appropriate in divergence are then emitted from the curved lens surface of the second lens portion. When the display screen of the display is touched with a finger, the touch panel precisely detects the position of a portion touched with the finger.

In the method of manufacturing the optical waveguide for the touch panel according to the preset invention, the core including the end portion formed as the first lens portion is formed on the predetermined portion of the surface of the body, and is set in the molding die. Then, the over cladding layer is formed by molding so as to have the bend whose end portion covering the above-mentioned first lens portion includes the second lens portion and the light reflecting surface. This achieves the manufacture of the optical waveguide for the touch panel, with proper mutual positional relationship maintained between the first lens portion provided in the end portion of each core, the above-mentioned second lens portion and the light reflecting surface.

DETAILED DESCRIPTION

Preferred embodiments according to the present invention will now be described in detail with reference to the drawings.

Figure 1:
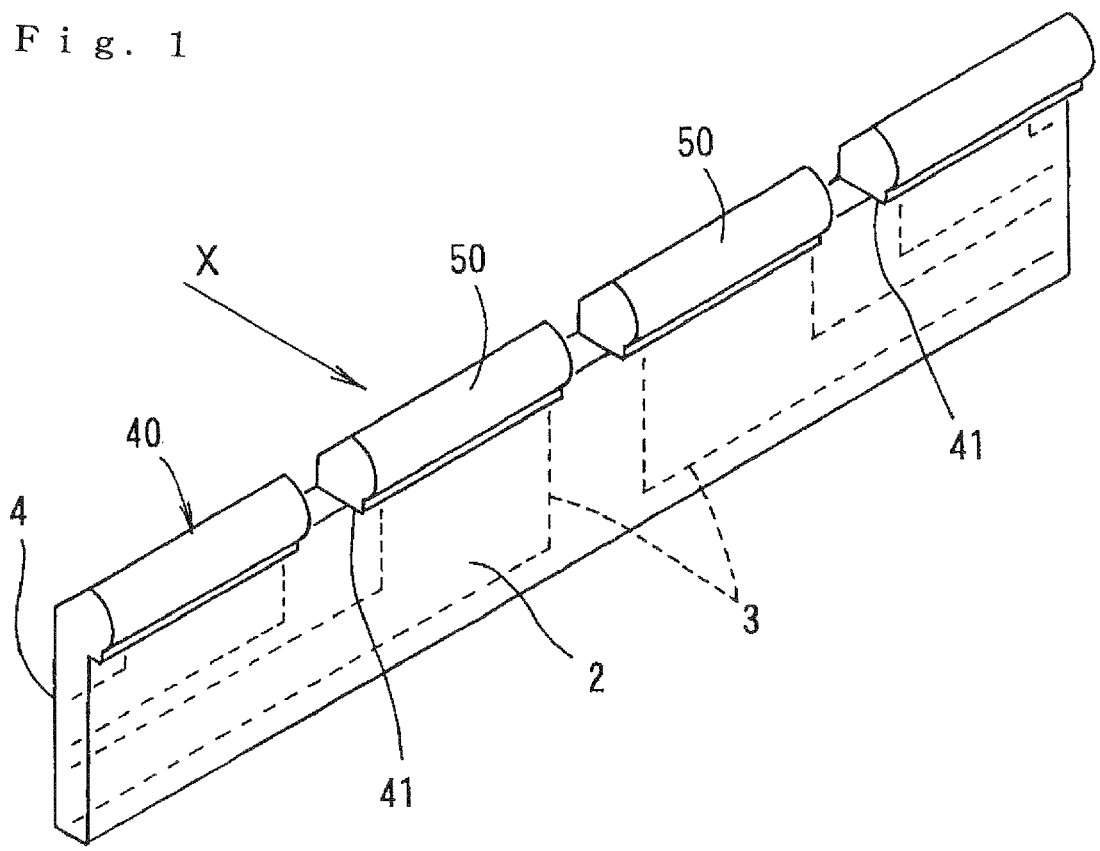
FIG. 1 is a perspective view schematically showing an optical waveguide according to a first preferred embodiment of the present invention.

FIG. 1 shows an optical waveguide for a touch panel according to a first preferred embodiment of the present invention. The optical waveguide for a touch panel according to this preferred embodiment is formed in a strip-shaped configuration, with a plurality of cores 3 held between and covered with an under cladding layer (body) 2 and an over cladding layer 4. The above-mentioned cores 3 extend in parallel from opposite ends (left-hand and right-hand ends as viewed in the figure) of the strip-shaped optical waveguide, and are bent upwardly (toward one longitudinal side of the strip-shaped optical waveguide) in regions corresponding to the longitudinal halves (the left-hand and right-hand halves as viewed in the figure) of the optical waveguide. The tips of the bent cores 3 are connected to bends (extensions) 40 provided in predetermined locations of an edge portion of the over cladding layer 4. The bends 40 extend in such a manner as to be bent toward the under cladding layer 2 as shown, and are equidistantly spaced apart from each other in the longitudinal direction of the optical waveguide. In FIG. 1, the cores 3 are indicated by broken lines, and the thickness of the broken lines indicates the thickness of the cores 3. Also, the number of cores 3 shown are abbreviated. In FIG. 1, the reference numeral 41 designates abutment surfaces for abutting against an upper edge portion of a display screen of a display 11 (with reference to FIG. 2), and 50 designates second lens portions, which will be described later.

Figure 2:
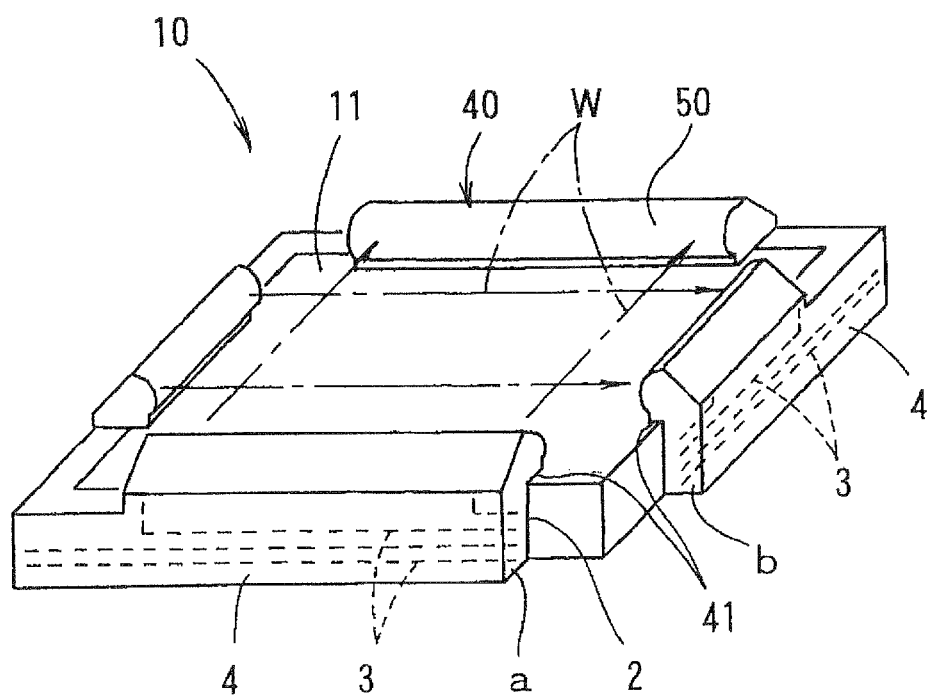
FIG. 2 is a perspective view schematically showing a touch panel using the above-mentioned optical waveguide.

As illustrated in FIG. 2, such an optical waveguide is bent at the four corners of the rectangular display 11 of a touch panel 10 and wound on and along the peripheral side surfaces of the rectangular display 11. A light source (not shown) is connected to the cores 3 on one end edge a of the above-mentioned wound optical waveguide, and a detector (not shown) is connected to the cores 3 on the other end edge b of the optical waveguide. For winding the above-mentioned strip-shaped optical waveguide, the abutment surfaces 41 formed under the above-mentioned second lens portions 50 are abutted against the upper edge portion of the display screen of the above-mentioned display 11, with the under cladding layer 2 oriented inwardly, and portions lying between the bends 40 are positioned and bent at the corners of the peripheral side surfaces of the display 11 for the touch panel. With the optical waveguide wound in this manner, two L-shaped portions (portions corresponding to the two regions, i.e. the right-hand half region and the left-hand half region, of the optical waveguide as viewed in FIG. 1) are opposed to each other, with the display screen of the display 11 therebetween. One of the L-shaped portions opposed to each other serves as a portion for emitting light beams W, and the other L-shaped portion serves as a portion for receiving the light beams W. In FIG. 2 as in FIG. 1, the cores 3 are indicated by broken lines, and the thickness of the broken lines indicates the thickness of the cores 3. Also, the number of cores 3 shown are abbreviated. Only some of the multiplicity of light beams W are shown in FIG. 2 for ease of understanding.

The optical waveguide (with reference to FIG. 1) according to the present invention which is wound in this manner on the display 11 for the touch panel has the following characteristics. A tip portion (having an elongated rectangular shape) of each of the cores 3 shown in FIG. 1 is formed as a first lens portion 30 (with the elongated rectangular shape having a widthwise arcuate top portion) having a substantially semi-circular curved lens surface 31 in front view which bulges outwardly (upwardly as viewed in the figure), as indicated by broken lines in FIG. 3(a) (which is an enlarged view of an upper portion of the optical waveguide of FIG. 1 as seen in the direction of the arrow X).

Figure 3A:
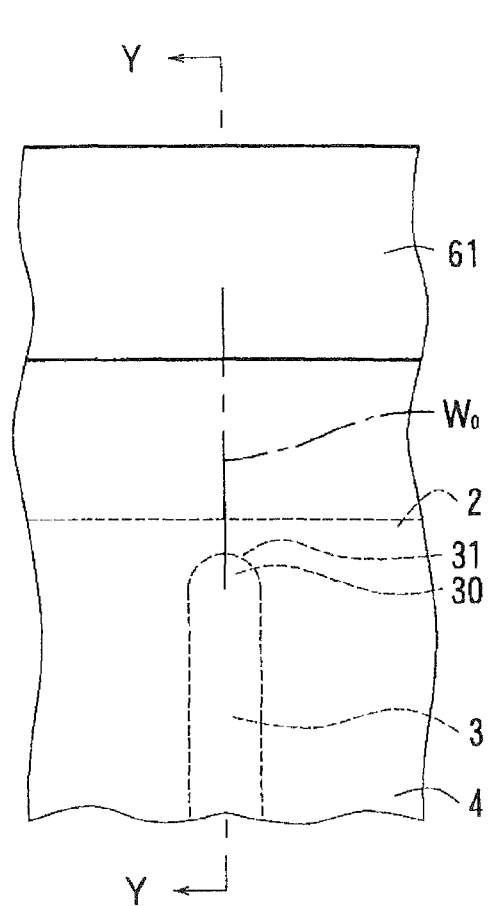
FIG. 3(a) is an enlarged view of an upper portion of the optical waveguide of FIG. 1 as seen in the direction of the arrow X.
Figure 3B:
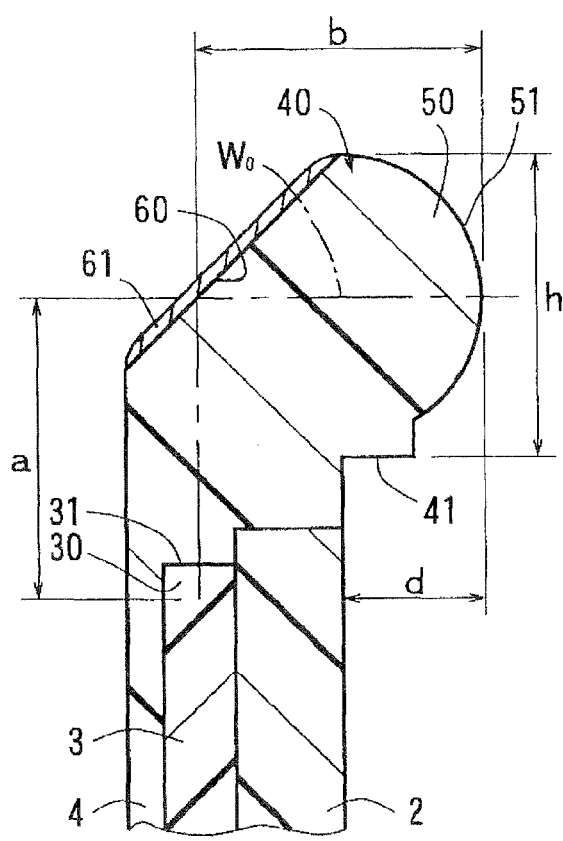
FIG. 3(b) is a sectional view taken along the line Y-Y of FIG. 3A.

Additionally, a tip portion of each of the above-mentioned bends 40 provided in the edge portion of the over cladding layer 4 is formed as the second lens portion 50 having a substantially quadrantal curved lens surface 51 in side view which bulges outwardly (rightwardly as viewed in the figure), as shown in FIG. 3(b) (which is a sectional view taken along the line Y-Y of FIG. 3(a)). A rear end portion of each of the bends 40 on the side opposite from the second lens portion 50 is in the form of an inclined surface serving as a light reflecting surface 60 for reflecting light beams emitted from the first lens portion 30 provided in the end portion of the above-mentioned core 3 to direct the light beams toward the curved lens surface 51 of the second lens portion 50 (or for reflecting light beams incident on the curved lens surface 51 of the second lens portion 50 to direct the light beams toward the curved lens surface 31 of the first lens portion 30). In this preferred embodiment, a thin metal film 61 is formed on the above-mentioned inclined surface to reflect light beams more readily. Further, in this preferred embodiment, the abutment surface 41 for abutting against the upper edge portion of the display screen of the display 11 for the touch panel (with reference to FIG. 2) is formed under the above-mentioned second lens portion 50, and the abutment surface 41 is used for the positioning on the upper edge portion of the display screen of the display 11 for a touch panel (with reference to FIG. 2). The dimensions of the bends 40 provided in the edge portion of the above-mentioned over cladding layer 4 are as follows. For example, the height (h) of the bends 40 is preferably in the range of 300 to 10000 μm, more preferably in the range of 500 to 8000 μm. The amount of protrusion (d) of the bends 40 from the under cladding layer 2 is preferably in the range of 100 to 6000 μm, more preferably in the range of 200 to 5000 μm.

The mutual positional relationship between the curved lens surface 31 of the above-mentioned first lens portion 30, the curved lens surface 51 of the second lens portion 50 and the light reflecting surface (inclined surface) 60 is determined so that a total distance (L) and the radius (R) of curvature of the curved lens surface 51 of the above-mentioned second lens portion 50 satisfy the following condition (A), the total distance (L) being the sum of a distance (a) from the center of curvature of the curved lens surface 31 of the above-mentioned first lens portion 30 to the above-mentioned light reflecting surface 60 (a point at which an optical axis Wo intersects the above-mentioned light reflecting surface 60) and a distance (b) from the light reflecting surface 60 (the point at which the optical axis Wo intersects the above-mentioned light reflecting surface 60) to the tip of the curved lens surface 51 of the above-mentioned second lens portion 50. The following condition (A) is an expression obtained by the present inventors after a multiplicity of repeated experiments. Optical transmission with proper optical transmission efficiency is achieved by the satisfaction of the expression. The distance (a) from the center of curvature of the curved lens surface 31 of the above-mentioned first lens portion 30 to the above-mentioned light reflecting surface 60 is preferably in the range of 400 to 10000 μm, more preferably in the range of 500 to 7000 μm. The distance (b) from the light reflecting surface 60 to the tip of the curved lens surface 51 of the above-mentioned second lens portion 50 is preferably in the range of 100 to 5000 μm, more preferably in the range of 200 to 3000 μm. The total distance (L) is preferably in the range of 500 to 15000 μm, more preferably in the range of 700 to 10000 μm.

$$(L/3)-0.5<R<(L/3)+0.5 \quad (A)$$

[where L in mm, and R in mm]

Figure 4:
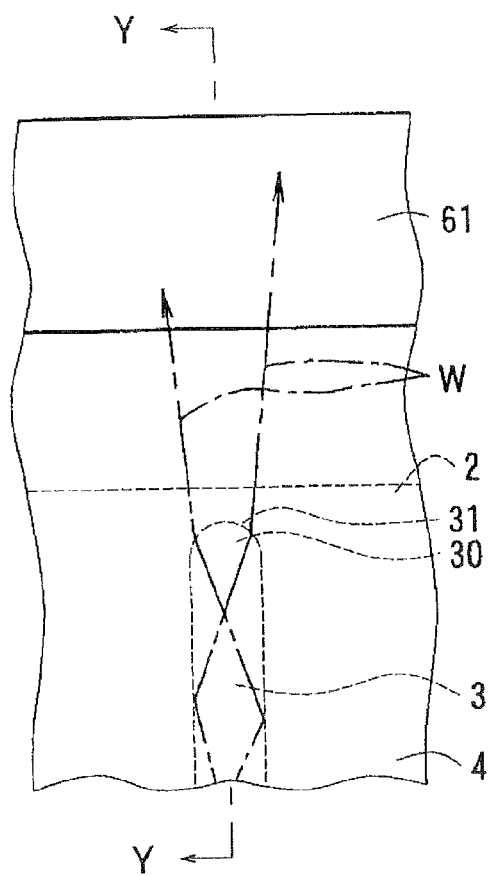
FIG. 4(a) is an enlarged view of the upper portion of the optical waveguide of FIG. 1 as seen in the direction of the arrow X, and schematically showing the emission of light beams in the above-mentioned optical waveguide.
FIG. 4(b) is a sectional view taken along the line Y-Y of FIG. 4(a), and schematically showing the emission of light beams in the above-mentioned optical waveguide.
Figure 4:
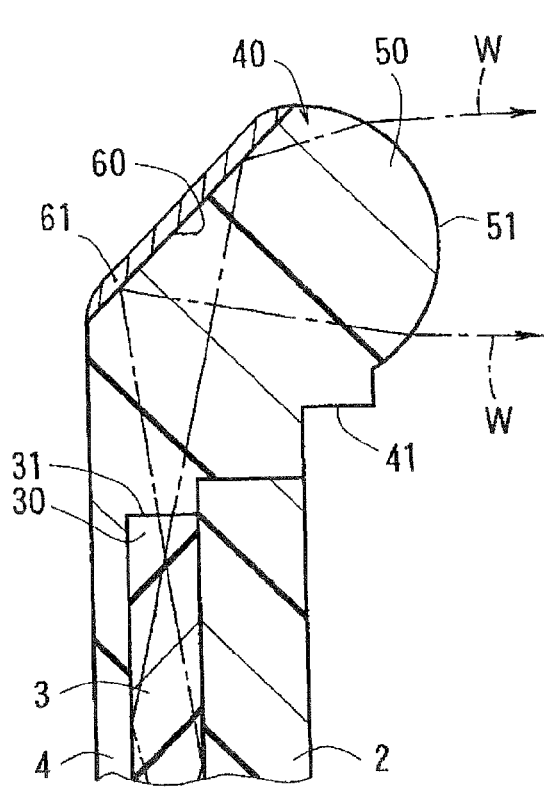

In the optical waveguide portion which emits the light beams W in the above-mentioned optical waveguide, as shown in FIG. 4(a), the horizontal divergence (the divergence along the under cladding layer 2) of the light beams W emitted from the curved lens surface 31 of the first lens portion 30 provided in the end portion of the core 3 is suppressed by the action of the curved lens surface 31. In this state, the light beams W travel in the bend 40 provided at the front of the curved lens surface 31 and in the edge portion of the over cladding layer 4. Then, the light beams W are reflected from the light reflecting surface in the bend 40, as shown in FIG. 4(b). This causes the optical path of the above-mentioned light beams W to change toward the second lens portion 50 provided in the tip portion of the bend 40, and the above-mentioned light beams W are emitted from the curved lens surface 51 of the second lens portion 50. At this time, the light beams W are restrained from diverging vertically (in a vertical direction along a plane perpendicular to the display 11 of the touch panel 10 as seen in the figure) by the action of the curved lens surface 51 to become close to parallel light beams. That is, the light beams W emitted from the first lens portion 30 provided in the end portion of the core 3 travel along the display screen of the above-mentioned display 11 while neither spreading too wide nor narrowing down by the refraction through the first lens portion 30, the reflection through the light reflecting surface 60 and the refraction through the second lens portion 50. This provides the appropriate area of a light-receiving region of the curved lens surface 51 of the second lens portion 50 in the optical waveguide portion which receives the light beams W.

In the optical waveguide portion which receives the light beams W, the light beams W travel in directions opposite from those indicated by the arrows in FIGS. 4(a) and 4(b). Specifically, the light beams W having traveled over the display screen of the above-mentioned display 11 are received by the curved lens surface 51 of the second lens portion 50 of the bend 40 provided in the edge portion of the over cladding layer 4, and are narrowed down and converged vertically (in a vertical direction along a plane perpendicular to the display 11 of the touch panel 10 as seen in the figure) by the action of the curved lens surface 51. In this state, the light beams W travel in the bend 40, and are reflected from the light reflecting surface 60. This causes the optical path of the above-mentioned light beams W to change toward the first lens portion 30 provided in the end portion of the core 3, and the above-mentioned light beams W enter the core 3 through the curved lens surface 31 of the first lens portion 30. At this time, the light beams W are narrowed down and converged horizontally (along the under cladding layer 2) by the action of the curved lens surface 31. While being converged, the light beams W travel toward the interior of the core 3.

Since such optical transmission is done in the above-mentioned optical waveguide, the light beams W are sets of close to parallel light beams and travel substantially in a lattice form over the display screen of the display 11 of the above-mentioned touch panel 10, as shown in FIG. 2. Thus, when the display screen of the display 11 is touched with a finger in this state, the position of a portion touched with the finger is precisely detected.

The dimensions and the like of the above-mentioned optical waveguide may be determined to conform to the size of the display 11 of the touch panel 10. For example, the length of the strip-shaped optical waveguide is on the order of 120 to 1200 mm, and the width of the strip-shaped optical waveguide is on the order of 5 to 100 mm. The number of cores 3 which emit the light beams W (which receives the light beams W) may be determined according to the number of operation details to be displayed on the display screen of the display 11, and is, for example, on the order of 20 to 150.

Next, an exemplary manufacturing method of such an optical waveguide according to the present invention will be described.

Figure 5:
FIGS. 5(a) to 5(e) are views schematically illustrating a manufacturing method of the above-mentioned optical waveguide.
Figure 5:
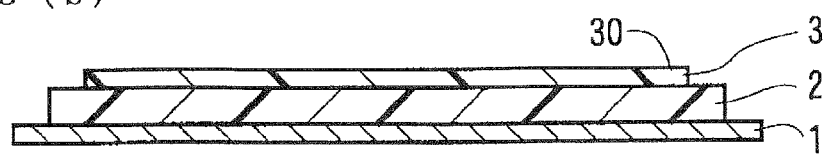
Figure 5:
Figure 5:
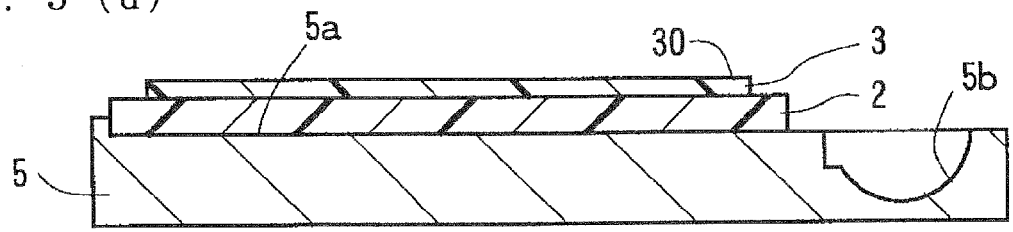
Figure 5:
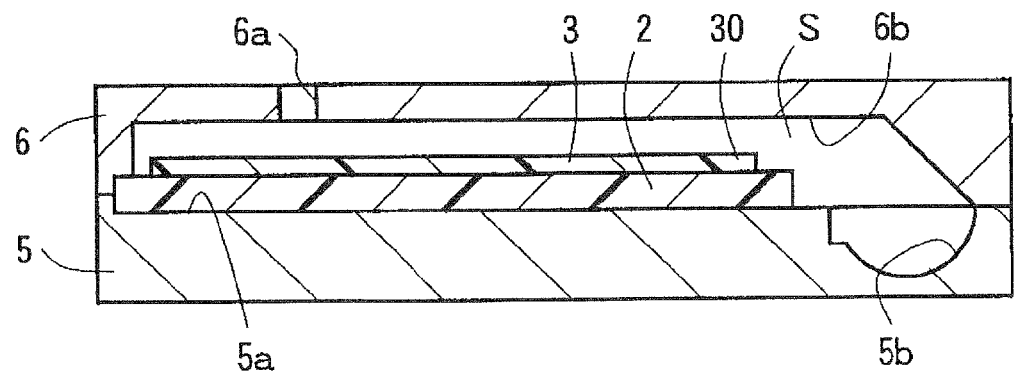

First, a base 1 of a flat shape for use in the manufacture of the above-mentioned optical waveguide (see FIG. 1) is prepared with reference to FIG. 5(a). Examples of a material for the formation of the base 1 include glass, quartz, silicon, resins, metals and the like. The thickness of the base 1 is, for example, in the range of 20 μm (for a film-like base 1) to 5 mm (for a plate-like base 1).

Next, as shown in FIG. 5(a), a photosensitive resin layer which is to be formed into the under cladding layer 2 is formed in a predetermined region on the above-mentioned base 1. The photosensitive resin layer 2 is exposed to irradiation light. Thereafter, a heating treatment is performed to complete a photoreaction. This forms the above-mentioned photosensitive resin layer into the under cladding layer 2. The thickness of the under cladding layer 2 (the photosensitive resin layer) is typically in the range of 1 to 50 μm, preferably in the range of 5 to 30 μm.

In the formation of the above-mentioned under cladding layer 2, a method of forming the photosensitive resin layer is executed by applying a varnish prepared by dissolving a photosensitive resin in a solvent and thereafter drying the varnish by a heating treatment. The application of the above-mentioned varnish is achieved, for example, by a spin coating method, a dipping method, a casting method, an injection method, an ink jet method and the like. The subsequent heating treatment is performed at 50° C. to 120° C. for 10 to 30 minutes. Examples of the irradiation light for the above-mentioned exposure used herein include visible light, ultraviolet light, infrared light, X-rays, alpha rays, beta rays, gamma rays and the like. Preferably, ultraviolet light is used. This is because the use of ultraviolet light achieves irradiation with large energy to provide a high rate of hardening, and an irradiation apparatus therefor is small in size and inexpensive to achieve the reduction in production costs. A light source of the ultraviolet light may be, for example, a low-pressure mercury-vapor lamp, a high-pressure mercury-vapor lamp, an ultra-high-pressure mercury-vapor lamp and the like. The dose of the ultraviolet light is typically 10 to 10000 mJ/cm$^2$, preferably 50 to 3000 mJ/cm$^2$. The subsequent heating treatment is performed at 80° C. to 250° C., preferably at 100° C. to 200° C., for 10 seconds to two hours, preferably for five minutes to one hour.

Next, as shown in FIG. 5(b), a photosensitive resin layer which is to be formed into the cores 3 is formed on the surface of the above-mentioned under cladding layer 2. Then, the above-mentioned photosensitive resin layer is exposed to irradiation light through an exposure mask formed with an opening pattern corresponding to the pattern of the cores 3 (including the first lens portion 30). Thereafter, a heating treatment is performed to complete a photoreaction. Further, development is performed using a developing solution to dissolve away an unexposed portion of the photosensitive resin layer, thereby forming the photosensitive resin layer remaining on the under cladding layer 2 into the pattern of the cores 3. Thereafter, the developing solution in the remaining photosensitive resin layer is removed by a heating treatment. Thus, the above-mentioned remaining photosensitive resin layer is formed into the cores 3. The thickness of the cores 3 (the photosensitive resin layer) is typically in the range of 20 to 150 μm, preferably in the range of 40 to 100 μm. The width of the cores 3 is typically in the range of 8 to 50 μm, preferably in the range of 10 to 25 μm.

In the formation of the above-mentioned cores 3, the formation of the photosensitive resin layer is carried out in a manner similar to the method for the formation of the photosensitive resin layer formed into the under cladding layer 2 described with reference to FIG. 5(a). A material for the formation of the cores 3 used herein is a material having a refractive index greater than that of the materials for the formation of the above-mentioned under cladding layer 2 and the over cladding layer 4 to be described later (with reference to FIG. 3(b)). The adjustment of this refractive index may be made, for example, by adjusting the selection of the types of the materials for the formation of the above-mentioned under cladding layer 2, the cores 3 and the over cladding layer 4 and the composition ratio thereof. The above-mentioned exposure and the subsequent heating treatment are carried out in a manner similar to those in the method for the formation of the under cladding layer 2 described with reference to FIG. 5(a). Further, the above-mentioned development employs, for example, an immersion method, a spray method, a puddle method and the like. Examples of the developing solution used herein include an organic solvent, an organic solvent containing an alkaline aqueous solution, and the like. The developing solution and conditions for the development are selected as appropriate depending on the composition of a photosensitive resin composition. The heating treatment after the above-mentioned development is typically performed at 80° C. to 120° C. for 10 to 30 minutes.

Next, the base 1 is removed from the under cladding layer 2, as shown in FIG. 5(c). An example of the method for the removal is as follows. A lower surface of the base 1 is brought into contact with an upper surface of a vacuum suction stage (not shown), and the base 1 is fixed thereon by air suction. Next, a vacuum suction machine (not shown) adheres to an exposed upper surface of the over cladding layer 4 under suction to lift an adhering portion thereof in this state. This removes the under cladding layer 2 of the optical waveguide from the base 1, with the cores 3 and the under cladding layer 2 bonded together. The adhesive force between the base 1 and the under cladding layer 2 is small because of the materials thereof. Thus, the above-mentioned process easily removes the base 1 from the under cladding layer 2.

Then, as shown in FIGS. 5(d) and 5(e), a molding die made of quartz (a material permeable to irradiation light such as ultraviolet light and the like) for the molding of the over cladding layer 4 (with reference to FIG. 3(b)) is prepared. This molding die includes a lower die 5 (with reference to FIG. 5d) and an upper die 6 (with reference to FIG. 5(e). As shown in FIG. 5(d), the lower die 5 is formed with a holding surface 5a for placing a laminate of the above-mentioned under cladding layer 2 and the cores 3 thereon, and a die surface 5b for the molding of the second lens portion 50 and the abutment surface 41 (with reference to FIG. 3(b)) of the bend 40 provided in the edge portion of the over cladding layer 4. As shown in FIG. 5(e), the upper die 6 is formed with an inlet 6a for injecting a molding material therethrough, and a die surface 6b for the molding of the light reflecting surface 60 of each of the above-mentioned bends 40 and a portion of the over cladding layer 4 which covers each of the cores 3 (with reference to FIG. 3(b).

For the formation of the over cladding layer 4 by using such a molding die, the laminate of the under cladding layer 2 and the cores 3 is initially positioned and placed on the holding surface 5a of the lower die 5, as shown in FIG. 5(d). Next, as shown in FIG. 5(e), the upper die 6 is joined onto the lower die 5 to define a mold space S therebetween. Next, a photosensitive resin which is to be formed into the over cladding layer 4 is charged through the inlet 6a formed in the above-mentioned upper die 6 into the mold space S. Exposure to irradiation light such as ultraviolet light and the like is performed through the above-mentioned molding die. After the molding die is removed, a heating treatment or the like is performed to form the over cladding layer 4 having the second lens portion 50, the light reflecting surface 60 and the abutment surface 41 (with reference to FIG. 3(b)). The exposure, the heating treatment and the like described above are carried out in a manner similar to those in the method for the formation of the under cladding layer 2 described with reference to FIG. 5(a). The thickness of the over cladding layer 4 (a thickness as measured from the surface of the cores 3) is typically in the range of 5 to 100 μm, preferably in the range of 10 to 80 μm.

The over cladding layer 4 (including the second lens portion 50, the light reflecting surface 60 and the abutment surface 41) is formed in this manner. Thus, the cores 3 and the over cladding layer 4 are integral with each other, with the first lens portion 30 provided in the end portion of each of the cores 3, the second lens portion 50 provided in the edge portion of the over cladding layer 4 and the light reflecting surface 60 being positioned relative to each other, when the over cladding layer 4 is formed. When the under cladding layer 2 and the over cladding layer 4 are made of the same material, the under cladding layer 2 and the over cladding layer 4 are integrated together at the contact portions thereof.

Thereafter, the thin metal film 61 is formed by plating or vapor deposition on the light reflecting surface 60 of each of the bends 40 provided in the edge portion of the above-mentioned over cladding layer 4. Examples of a material for the formation of the thin metal film 61 include nickel, copper, silver, gold, chromium, aluminum, zinc, tin, cobalt, tungsten, platinum, palladium, an alloy material including at least two of these elements, and the like. The thickness of the thin metal film 61 is, for example, in the range of 50 nm to 5 μm. In this manner, the strip-shaped optical waveguide shown in FIG. 1 is obtained.

Figure 6:
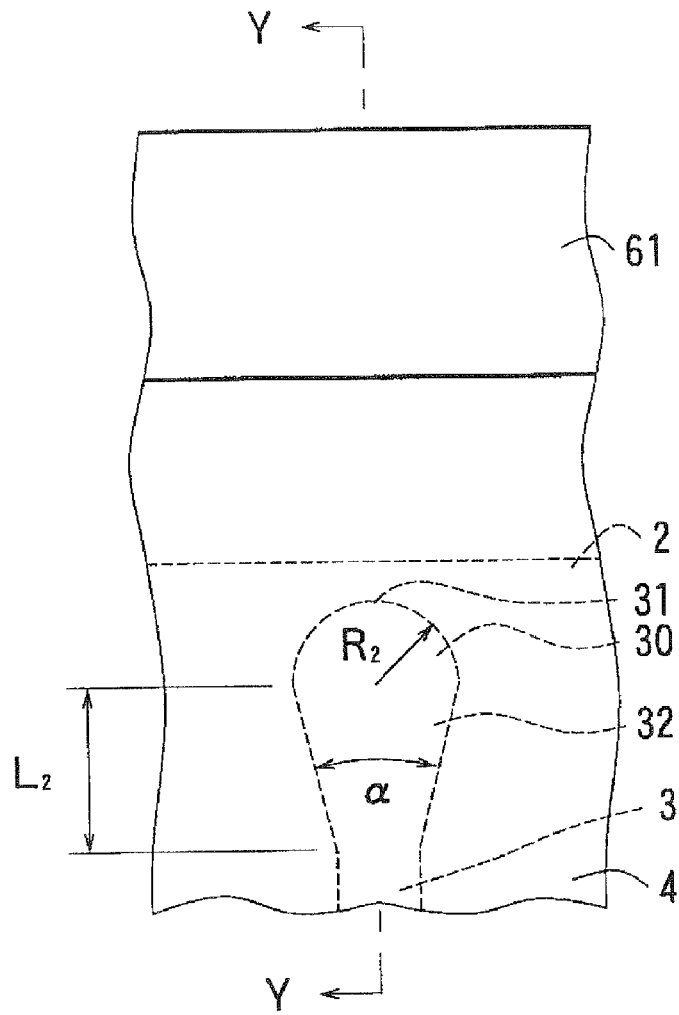
FIG. 6 is a view corresponding to FIG. 3(a) and schematically showing the optical waveguide according to a second preferred embodiment of the present invention.
Figure 7:
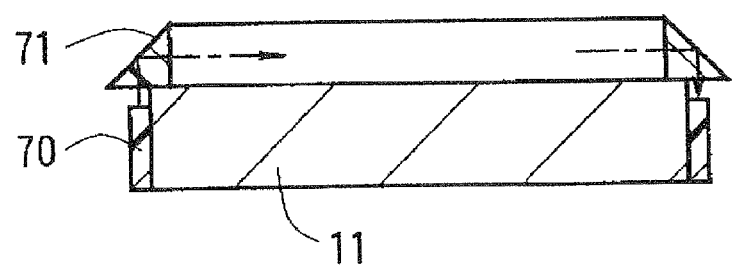
FIG. 7 is a sectional view schematically showing a touch panel using a conventional optical waveguide.

FIG. 6 shows the optical waveguide according to a second preferred embodiment of the present invention. The optical waveguide according to the second preferred embodiment is such that the first lens portion 30 provided in the end portion of each of the cores 3 in the above-mentioned first preferred embodiment is formed in the shape of a head portion of what is called a rice paddle, as shown in FIG. 6 (in front view). A sectional view taken along the line Y-Y of FIG. 6 is similar to that of FIG. 3(*b*). The first lens portion 30 is flat as shown in the sectional view of FIG. 3(*b*). The formation of the above-mentioned first lens portion 30 is achieved by changing the opening pattern of the exposure mask used for the formation of the cores 3 to that corresponding to the pattern of the cores 3 including the above-mentioned first lens portion 30. Except for this, the second preferred embodiment is similar to the first preferred embodiment described above. Like reference numerals and characters are used in the second preferred embodiment to designate parts similar to those of the first preferred embodiment.

The first lens portion 30 provided in the end portion of the above-mentioned core 3 and having the shape of a head portion of what is called a rice paddle will be described in further detail. The above-mentioned first lens portion 30 has a tapered portion 32 such that the width thereof gradually increases toward the end surface thereof, and the end surface thereof is formed as the substantially semicircular curved lens surface 31 in front view which bulges outwardly. The dimensions of the first lens portion 30 provided in the end portion of the above-mentioned core 3 are as follows:

(1) When the above-mentioned tapered portion 32 has a length ($L_2$) of not less than 800 μm, a taper angle ($\alpha$) is in the range of 2 to 20 degrees, and the length ($L_2$) of the above-mentioned tapered portion 32, the taper angle ($\alpha$) thereof and the radius ($R_2$) of curvature of the curved lens surface 31 satisfy the following condition (B). The following condition (B) is an expression obtained by the present inventors after repeated experiments. In this case [where the length ($L_2$) of the tapered portion 32 is not less than 800 μm], there is no upper limit to the length ($L_2$) of the tapered portion 32. However, the excessively great length ($L_2$) of the tapered portion 32 merely requires much space on the peripheral side surfaces of the display 11 (see FIG. 2) of the touch panel 10, and does not make sense in terms of optical transmission.

(2) When the above-mentioned tapered portion 32 has a length ($L_2$) of less than 800 μm, the length ($L_2$) of the tapered portion 32 is set at not less than 400 μm (set so as not to fall below 400 μm), the taper angle ($\alpha$) is in the range of 4 to 16 degrees, and the following condition (B) is satisfied.

$$0.5 \times L_2 \times \tan(\alpha/2) < R_2 < 2.5 \times L_2 \times \tan(\alpha/2) \quad (B)$$

[where $L_2$ in μm, $\alpha$ in degrees, and $R_2$ in μm]

The horizontal divergence (the divergence along the under cladding layer 2) of the light beams W emitted from each of the cores 3 is suppressed by refraction through the first lens portion 30 provided in the end portion of each of the cores 3. Specifically, the light beams W travel in each of the cores 3 while being reflected frequently repeatedly, and are reflected in the tapered portion 32 of the first lens portion 30 having the shape of a head portion of a rice paddle so as to be easily directed toward the curved lens surface 31 at the extreme tip [i.e., the angles of reflection are adjusted by adjusting the taper angle ($\alpha$) of the tapered portion 32]. The number of times of reflection decreases as the light beams W travel along an increasing-width tip portion of the first lens portion 30, and the light beams W emitted from the curved lens surface 31 at the extreme tip are closer to parallel light beams as seen in front view because of the configuration of the curved lens surface 31. Thus, the light beams reflected from the above-mentioned light reflecting surface 60 and emitted from the curved lens surface 51 of the second lens portion 50 are closer to parallel light beams. As a result, this increases optical transmission efficiency to improve the precision of the finger detection in the touch panel 10 (see FIG. 2).

Although the thin metal film 61 is formed on the light reflecting surface 60 of each of the bends 40 provided in the edge portion of the over cladding layer 4 in the above-mentioned preferred embodiments, the thin metal film 61 is optional. Because the refractive index of the over cladding layer 4 is greater than that of air present outside the above-mentioned light reflecting surface 60, almost all of the light beams traveling in the above-mentioned bends 40 are reflected upon impinging upon the light reflecting surface 60.

Although the abutment surface 41 for abutting against the upper edge portion of the display screen of the display 11 is formed under the second lens portion 50 in the above-mentioned preferred embodiments, the abutment surface 41 is optional. In this case, the lower edge portion of the second lens portion 50 is formed so as to extend to the under cladding layer 2 directly.

In the above-mentioned preferred embodiments, the formation of the under cladding layer 2 and the over cladding layer 4 uses the photosensitive resin as the materials thereof, and is achieved by exposure to light and development. However, other materials and other methods may be used. As an example, the formation of the under cladding layer 2 and the over cladding layer 4 may use a thermosetting resin such as polyimide resin and epoxy resin as the materials of the under cladding layer 2 and the over cladding layer 4, and may be achieved by applying a varnish prepared by dissolving the thermosetting resin in a solvent and then performing a heating treatment (typically at 300° C. to 400° C. for 60 to 180 minutes) to harden the varnish and the like.

The photosensitive resin is used to form the under cladding layer 2 in the above-mentioned preferred embodiments, but other than the photosensitive resin may be used. A resin film may be used as the under cladding layer 2. Alternatively, a substrate with a metal film or a thin metal film formed on the surface thereof may be used in place of the under cladding layer 2 so that the surface of the metal material functions as a surface for reflecting the light beams W propagating inside the cores 3.

Next, inventive examples of the present invention will be described in conjunction with comparative examples. It should be noted that the present invention is not limited to the inventive examples.

EXAMPLES

Inventive Examples 1 to 4 and Comparative Examples 1 and 2

Material for Formation of Under Cladding Layer and Over Cladding Layer

A material for formation of an under cladding layer and an over cladding layer was prepared by mixing 35 parts by weight of bisphenoxyethanol fluorene glycidyl ether (component A) represented by the following general formula (1), 40 parts by weight of 3',4'-epoxycyclohexylmethyl-3,4-epoxycyclohexane carboxylate which is an alicyclic epoxy resin (CELLOXIDE 2021P manufactured by Daicel Chemical Industries, Ltd.)(Component B), 25 parts by weight of (3',4'-epoxycyclohexane)methyl-3', 4'-epoxycyclohexyl-carboxylate (CELLOXIDE 2081 manufactured by Daicel Chemical Industries, Ltd.) (Component C), and 2 parts by weight of a 50% propione carbonate solution of 4,4'-bis[di (β-hydroxyethoxy)phenylsulfinio]phenyl-sulfide-bis-hexafluoroantimonate (component D).

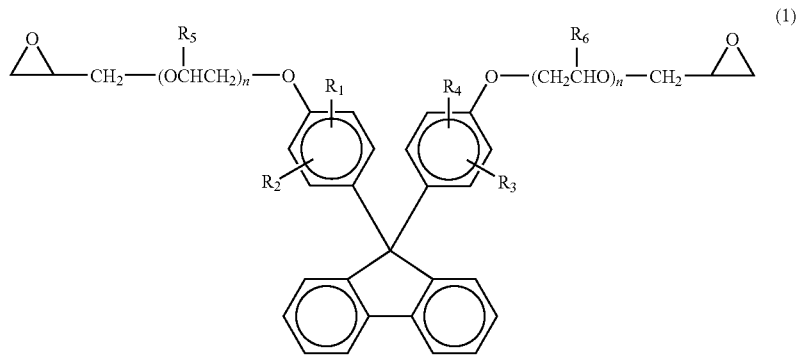

(1)

wherein $R_1$ to $R_6$ are hydrogen atoms, and n=1.

Material for Formation of Cores

A material for formation of cores was prepared by dissolving 70 parts by weight of the aforementioned component A, 30 parts by weight of 1,3,3-tris{4-[2-(3-oxetanyl)]butoxyphenyl}butane and one part by weight of the aforementioned component D in 28 parts by weight of ethyl lactate.

Production of Optical Waveguide

The material for the formation of the above-mentioned under cladding layer was applied to the surface of a polyethylene naphthalate (PEN) film [300 mm×300 mm×188 μm (thick)] by a spin coating method. Thereafter, exposure by the use of irradiation with ultraviolet light at 2000 mJ/cm² was performed through a synthetic quartz chrome mask (exposure mask) formed with a 250 mm×8 mm rectangular opening. Subsequently, a heating treatment was performed at 100° C. for 15 minutes to form the under cladding layer. The thickness of this under cladding layer was 200 μm when measured with a contact-type film thickness meter. The refractive index of this under cladding layer at a wavelength of 830 nm was 1.502.

Next, the material for the formation of the above-mentioned cores was applied to the surface of the above-mentioned under cladding layer by a spin coating method. Thereafter, a drying process was performed at 100° C. for 15 minutes. Next, a synthetic quartz chrome mask (exposure mask) formed with an opening pattern identical in shape with a core pattern (including a first lens portion) was placed over the resulting core material. Then, exposure by the use of irradiation with ultraviolet light at 4000 mJ/cm² was performed by a contact exposure method from over the mask. Thereafter, a heating treatment was performed at 120° C. for 15 minutes. Next, development was carried out using an aqueous solution of γ-butyrolactone to dissolve away an unexposed portion. Thereafter, a heating treatment was performed at 120° C. for 30 minutes to form the cores. An end portion of each of the cores which emitted light beams and an end portion of each of the cores which received light beams were formed as a tapered portion (having a taper angle of 7 degrees and a length of 2300 μm) such that the width thereof gradually increased toward the end surface thereof, and the above-mentioned end surface was formed as an arcuately curved surface in front view (having a radius of curvature of 160 μm) which bulged outwardly (or formed as the first lens portion), so that the horizontal divergence of the emitted light beams was suppressed. The dimensions of a core portion other than these end portions in cross section were 15 μm in width×30 μm in height. The above-mentioned dimensions were measured with an SEM (electron microscope). The refractive index of the cores at a wavelength of 830 nm was 1.588.

Next, a lower surface of the above-mentioned PEN film was brought into contact with an upper surface of a vacuum suction stage, and the PEN film was fixed thereon by air suction. Thereafter, a vacuum suction machine (not shown) adhered to an exposed upper surface of the under cladding layer under suction to lift an adhering portion thereof in this state. This removed the under cladding layer of an optical waveguide from the PEN film, with the cores and the under cladding layer bonded together.

Then, a molding die made of quartz and including a lower die and an upper die for the formation of the over cladding layer was prepared so as to conform to a distance (a) from the center of curvature of a curved lens surface of the first lens portion to a light reflecting surface, a distance (b) from the light reflecting surface to the tip of a curved lens surface of a second lens portion, and the radius (R) of curvature of the curved lens surface of the second lens portion which were shown in Tables 1 and 2 below (for Inventive Examples 1 to 4 and Comparative Examples 1 and 2). A laminate of the above-mentioned under cladding layer and the cores was positioned and placed on a holding surface of the lower die. Thereafter, the upper die is joined onto the lower die to define a mold space therebetween. In this state, the material for the formation of the above-mentioned over cladding layer was charged through an inlet formed in the upper die into the mold space.

Then, exposure by the use of irradiation with ultraviolet light at 2000 mJ/cm² was performed through the above-mentioned molding die. After the molding die was removed, a heating treatment was performed at 150° C. for 60 minutes to thereby form the over cladding layer. The thickness (the thickness as measured from the surface of the cores) of the over cladding layer was 100 μm when measured with a contact-type film thickness meter. The refractive index of the over cladding layer at a wavelength of 830 nm was 1.502.

Thereafter, a thin metal film (having a thickness of 200 nm) made of silver (Ag) was formed by vapor deposition on the light reflecting surface of a bend formed in an edge portion of the above-mentioned over cladding layer. In this manner, a strip-shaped optical waveguide (250 mm×12 mm) was obtained.

Measurement of Optical Loss Value

The obtained optical waveguide was wound on and along the peripheral side surfaces of a rectangular glass panel. This provided a single light-receiving core in opposed relation to a single light-emitting core. The optical loss value of such a pair of cores was measured in a manner to be described below. Specifically, a light emitting device (VCSEL of 5 mA and having a wavelength of 850 nm) was connected to one end surface of the light-emitting core (an end surface thereof opposite from the first lens portion) by using a manual axis-adjustment stage, and a power meter was connected to one end surface of the light-receiving core (an end surface thereof opposite from the first lens portion) through a multimode fiber (having a core diameter of 50 μm). Light beams were emitted from the above-mentioned light emitting device, and the above-mentioned power meter measured an optical loss value when the light beams were detected. As a result, an optical loss value of less than 20 dB was evaluated as being a "low optical loss value" and indicated by an open circle (◯), and an optical loss value of not less than 20 dB was evaluated as being a "high optical loss value" and indicated by a cross (X). The results of the evaluation were also shown in Tables 1 and 2 below.

TABLE 1

| | Inventive Examples | | | |
| --- | --- | --- | --- | --- |
| | 1 | 2 | 3 | 4 |
| From Center of Curvature of 1st Lens Portion to Light Reflecting Surface: a (mm) | 0.7 | 0.9 | 6.0 | 15.0 |
| From Light Reflecting Surface to Tip of 2nd Lens Portion: b (mm) | 0.3 | 0.4 | 3.0 | 7.5 |
| a + b: L (mm) | 1.0 | 1.3 | 9.0 | 22.5 |
| Radius of Curvature: R (mm) | 0.32 | 0.43 | 3.10 | 7.55 |
| (L/3) − 0.5 | −0.167 | −0.067 | 2.5 | 7.2 |
| (L/3) + 0.5 | 0.833 | 0.933 | 3.5 | 8.2 |
| Optical Loss Value (dB) | 18.9 | 18.8 | 16.8 | 16.5 |
| Value Evaluation | ◯ | ◯ | ◯ | ◯ |

TABLE 2

| | Comparative Examples | |
| --- | --- | --- |
| | 1 | 2 |
| From Center of Curvature of 1st Lens Portion to Light Reflecting Surface: a (mm) | 0.6 | 6.0 |
| From Light Reflecting Surface to Tip of 2nd Lens Portion: b (mm) | 0.2 | 2.0 |
| a + b: L (mm) | 0.8 | 8.0 |
| Radius of Curvature: R (mm) | 0.80 | 2.00 |
| (L/3) − 0.5 | −0.233 | 2.167 |
| (L/3) + 0.5 | 0.767 | 3.167 |
| Optical Loss Value (dB) | 32.6 | 28.0 |
| Value Evaluation | X | X |

The foregoing results show that the optical waveguides according to Inventive Examples 1 to 4 wherein the mutual positional relationship between the first lens portion provided in the end portion of each of the cores, the light reflecting surface and the second lens portion provided in the edge portion of the over cladding layer, and the radius of curvature of the curved lens surface of the second lens portion are within a specific range are low in optical loss value, and the optical waveguides according to Comparative Examples 1 and 2 wherein the mutual positional relationship and the radius of curvature are outside the above-mentioned range are high in optical loss value.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

What is claimed is:

1. An optical waveguide for a touch panel, comprising:
a body;
a plurality of cores formed on a predetermined portion of a surface of the body, the plurality of cores including a light-emitting core for emitting light beams and a light-receiving core for receiving the light beams; and
an over cladding layer formed on the surface of said body while covering the plurality of cores,
the optical waveguide being provided along peripheral side surfaces of a display of the touch panel,
the light-emitting core including an end portion positioned in a first side portion of the peripheral side surfaces of said display,
the light-receiving core including an end portion positioned in a second side portion of the peripheral side surfaces of said display,
the end portion of said light-emitting core and the end portion of the light-receiving core each being formed as a first lens portion having a curved lens surface which bulges outwardly,
the curved surface of the first lens portion being formed as the lens portion to suppress the divergence of the light beams emitted from the end portion of the core in a horizontal direction along the under cladding layer or to narrow down and converge the light beams entering the end portion of the core in a horizontal direction along the under cladding layer,
the over cladding layer including an edge portion covering said first lens portion,
the edge portion of the over cladding layer extending while being bent toward said body to form a bend, the bend including a tip portion formed as a second lens portion having a curved lens surface which bulges outwardly, the curved surface of the second lens portion being formed as the lens portion to suppress the divergence of the light beams emitted from the end portion of the over cladding layer in a vertical direction along a plane perpendicular to the display of the touch panel or to narrow down and converge the light beams entering the end portion of the over cladding layer in a vertical direction along the plane perpendicular to the display of the touch panel, the bend including a rear end portion on the side opposite from the second lens portion, the rear end portion of the bend being formed as a light reflecting surface for changing the optical path of light beams so as to cause the same light beams to pass through the curved lens surface provided in the tip portion of said first lens portion and the curved lens surface provided in the tip portion of the second lens portion, wherein a total distance (L) which is the sum of a distance from the center of curvature of the curved lens surface of said first lens portion to said light reflecting surface and a distance from the light reflecting surface to the tip of the curved lens surface of said second lens portion, and the radius (R) of curvature of the curved lens surface of said second lens portion satisfy the following condition (A):

$$(L/3) - 0.5 < R < (L/3) + 0.5 \qquad (A)$$

where L in mm, and R in mm.

2. The optical waveguide for the touch panel according to claim 1, wherein said body is formed of an under cladding material or a metal material.

3. The optical waveguide for the touch panel according to claim 1, wherein a thin metal film is formed on said light reflecting surface.

4. A touch panel comprising:
a display including a display screen; and
an optical waveguide including a body, a plurality of cores formed on a predetermined portion of a surface of the body, the plurality of cores including a light-emitting core for emitting light beams and a light-receiving core for receiving the light beams, and an over cladding layer formed on the surface of said body while covering the plurality of cores, the optical waveguide being provided along peripheral side surfaces of the display of the touch panel, the light-emitting core including an end portion positioned in a first side portion of the peripheral side surfaces of said display, the light-receiving core including an end portion positioned in a second side portion of the peripheral side surfaces of said display, the end portion of said light-emitting core and the end portion of the light-receiving core being formed as a first lens portion having a curved lens surface which bulges outwardly, the curved surface of the first lens portion being formed as the lens portion to suppress the divergence of the light beams emitted from the end portion of the core in a horizontal direction along the under cladding layer or to narrow down and converge the light beams entering the end portion of the core in a horizontal direction along the under cladding layer, the over cladding layer including an edge portion covering said first lens portion, the edge portion of the over cladding layer extending while being bent toward said body to form a bend, the bend including a tip portion formed as a second lens portion having a curved lens surface which bulges outwardly, the curved surface of the second lens portion being formed as the lens portion to suppress the divergence of the light beams emitted from the end portion of the over cladding layer in a vertical direction along a plane perpendicular to the display of the touch panel or to narrow down and converge the light beams entering the end portion of the over cladding layer in a vertical direction along the plane perpendicular to the display of the touch panel, the bend including a rear end portion on the side opposite from the second lens portion, the rear end portion of the bend being formed as a light reflecting surface for changing the optical path of light beams so as to cause the same light beams to pass through the curved lens surface provided in the tip portion of said first lens portion and the curved lens surface provided in the tip portion of the second lens portion, wherein the following relationship is satisfied $$(L/3) - 0.5 < R < (L/3) + 0.5$$

where L is a total distance in millimeters which is the sum of a distance from the center of curvature of the curved lens surface of said first lens portion to said light reflecting surface and a distance from the light reflecting surface to the tip of the curved lens surface of said second lens portion, and R is the radius of curvature of the curved lens surface of said second lens portion in millimeters, and wherein the bend provided in the edge portion of the over cladding layer which covers said first lens portion is positioned on a peripheral edge portion of the display screen of the display.

* * * * *